June 30, 1953 F. TODD 2,643,574
METHOD AND EXCITATION CHAMBER FOR SPECTROSCOPIC ANALYSES
Filed Feb. 14, 1951
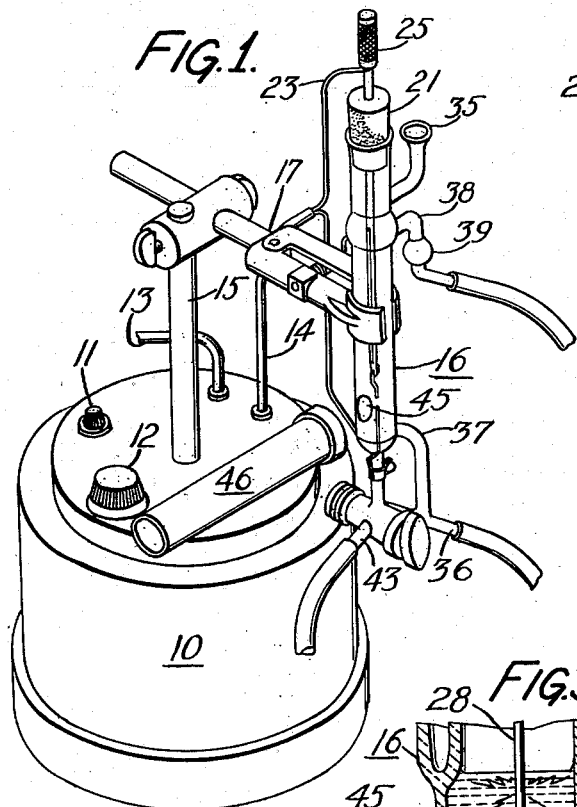
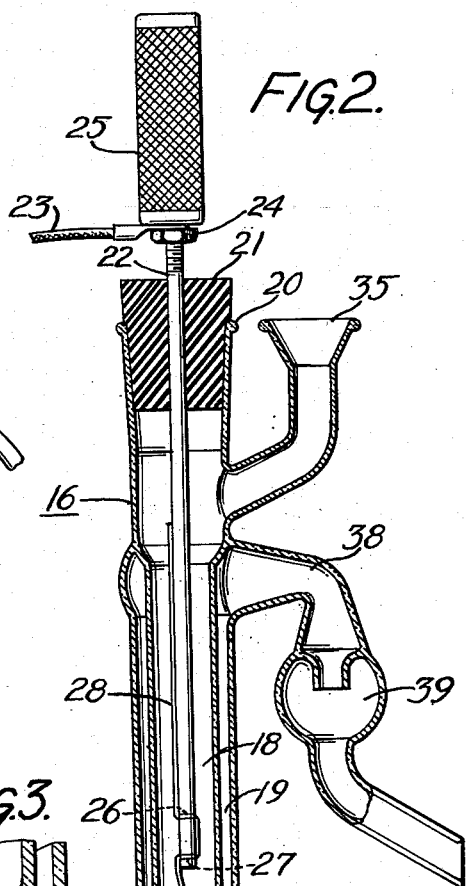
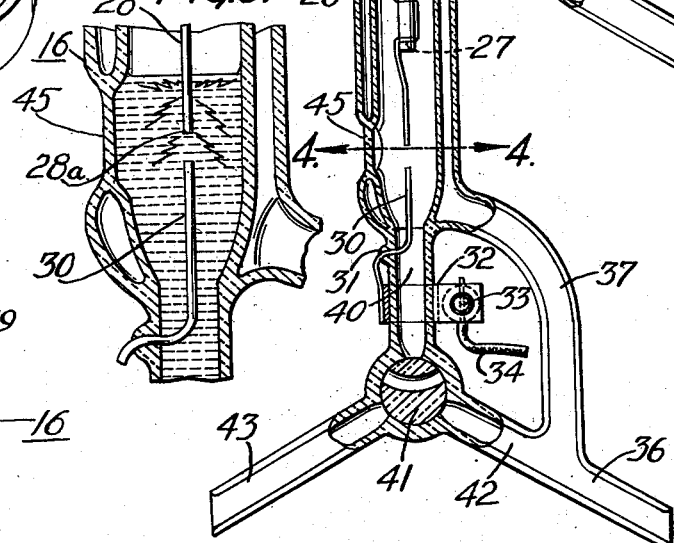
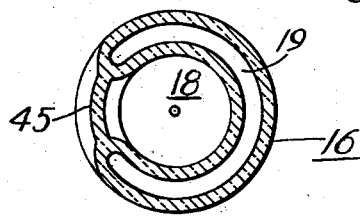
Inventor:
Floyd Todd
by his Attorneys
Howson & Howson Patented June 30, 1953

2,643,574

UNITED STATES PATENT OFFICE 2,643,574

METHOD AND EXCITATION CHAMBER FOR SPECTROSCOPIC ANALYSES

Floyd Todd, Springfield, Pa.

Application February 14, 1951, Serial No. 210,972

3 Claims. (Cl. 88—14)

This invention relates to a method and apparatus for making rapid spectroscopic analyses in which the substance to be analyzed is dissolved in a suitable electrolyte and the electrolyte is then introduced into an excitation chamber having electrodes for creating a submerged arc in the electrolyte.

The present invention is concerned primarily with qualitative analysis employing a spectroscope. In general, this procedure involves heating a sample of the substance to be analyzed to incandescence by suitable means of excitation in such a way that the molecules of the sample are disassociated into their constituent atoms, thus emitting light. This light when viewed through the spectroscope, produces a series of bright lines which may be superimposed on a reference scale and arranged in accordance with the wavelengths of the light source. Since each chemical element emits a well known group of lines having wavelengths that can be readily recognized, a comparison of the lines emitted by the sample with standard reference lines, enables the operator to determine what elements are present in the sample.

Previous methods of spectroscopic analysis are recognized to be positive and accurate but the absence of a suitable excitation chamber or means for creating the characteristic lines of the sample, has rendered these methods impractical, time-consuming and expensive for many laboratories. For example, methods employing spectrographs and spectrophotometers are comparatively expensive and require many accessories. Chemical analysis in general requires many tests to determine the presence or absence of the elements and relatively large samples are needed which are usually totally consumed. Much expensive laboratory equipment requiring substantial time for set-up and manipulation, is inherent in such procedure.

The present method and apparatus on the other hand, is extremely simple, accurate, inexpensive, and expeditious. For example, the sensitivity of the method and apparatus is illustrated by referring to the following table which gives the limits of detection of all the common metallic elements except aluminum and potassium, together with several rare elements.

| Barium | 0.07 | Mangnesium | 0.005 |
|---|---|---|---|
| Bismuth | 0.9 | Manganese | 0.07 |
| Cadmium | 0.2 | Mercury | 0.4 |
| Calcium | 0.02 | Nickel | 1.0 |
| Cerium | 1.0 | Palladium | 0.2 |
| Chromium | 0.2 | Rhodium | 0.3 |
| Cobalt | 1.0 | Scandium | 0.1 |
| Copper | 0.1 | Silver | 0.03 |
| Europium | 0.5 | Sodium | 0.009 |
| Gallium | 0.3 | Strontium | 0.02 |
| Gold | 0.2 | Thallium | 0.1 |
| Indium | 0.03 | Tin | 0.2 |
| Iron | 0.5 | Titanium | 0.6 |
| Lanthanum | 2.0 | Vanadium | 0.4 |
| Lead | 0.7 | Yttrium | 0.1 |
| Lithium | 0.04 | Zinc | 0.06 |

The limit of detection for the metallic element as shown in the foregoing table, is the minimum concentration expressed in milligrams per milliliter of test solution in which the individual elements have been detected, in accordance with the present invention. When more than one metallic element is present in the same test solution, the limits of detection are somewhat higher.

Specifically, I have found that when two electrodes such as iron, copper, silver, platinum, tungsten or carbon are immersed in an aqueous solution of an ionizable material such as an acid, base, salt, or mixtures of the same, and when a comparatively low voltage (for example, 50–130 volts) is impressed across the electrodes, the one having the lesser surface area exposed to the electrolyte emits a visible arc.

While it will be understood that the above described arcing can be produced in acid, neutral or alkaline aqueous solutions, I prefer to use acid or neutral solutions since metal compounds are more generally soluble in them. Also I prefer to employ platinum electrodes since no characteristic spectroscopic lines for the platinum will be emitted.

The preferred apparatus for producing the above described submerged arc comprises a double walled chamber having a fixed bottom electrode and an adjustable upper electrode which are so located in the chamber that the arc produced is in registry with a small window in the side of the chamber. Since considerable heat may be generated during the arcing, coolant is circulated in a jacket around the chamber and a convenient three-way valve permits quick draining of the electrolyte as well as subsequent flushing of the interior of the chamber with coolant.

A primary object of the invention therefore, is to provide an excitation chamber having a pair of electrodes capable of being submerged in a liquid in the chamber.

A further object of the invention is to provide an improved excitation chamber for spectroscopic analysis, having a jacket through which coolant may be circulated, a window in registry with enclosed electrodes, and a by-pass for circulating coolant into the electrolyte chamber.

A further object of the invention is to provide an improved method of producing a source of illumination for spectroscopic analysis of metal-containing samples.

Further objects will be apparent from the specification and drawings in which:

Fig. 1 is a perspective showing my improved spectroscopic illumination source conveniently mounted on a bracket and suitable base;

Fig. 2 is a vertical sectional view of the chamber shown in Fig. 1;

Fig. 3 is an enlarged sectional detail showing the source of illumination; and

Fig. 4 is a transverse section as seen at 4—4 of Fig. 2.

Referring now more particularly to the drawings, a base 10, which houses suitable electrical control and safety devices, is provided with a switch knob 11, a rheostat knob 12, input electrical line 13, and output electrical line 14. A central post or bracket 15 on base 10 supports my improved excitation chamber assembly 16 by means of a conventional sliding bracket 17. The chamber 16 is preferably made of heat-resistant glass tubing such as "Pyrex," having an inner chamber 18 which is surrounded by a coolant jacket 19 (Fig. 2). Inner chamber 18 communicates with the neck 20 of the chamber which carries a rubber stopper 21 that is bored to slidably support an electrode holder 22. Electrical lead 23 is clamped to holder 22 by means of nut 24 and knob 25. The lower end of holder 22 is transversely apertured at 26 and 27 to support the upper electrode 28 which is preferably a length of platinum wire threaded through apertures 26 and 27 and depending downwardly therefrom. The lower electrode 30 is introduced into chamber 18 at 31 and is electrically connected to a strap 32 having a binding post 33 to which lead 34 is connected. The electrolyte to be analyzed may be introduced into chamber 18 through a funnel-shaped spout 35, the bore of which is in communication with chamber 18. Coolant for jacket 19 is introduced thereto through conduits 36 and 37 which communicate with the bottom of the chamber, and coolant discharge is through spout 38 which has a trap 39 through which the flow of coolant may be observed.

Chamber 18 terminates at its lower end in a narrowed passage 40 which forms one arm of a three-way stopcock 41. The second arm 42 for the stopcock communicates with coolant passage 36 and in effect provides a by-pass for the coolant so that it may be used as a cleaning or flushing medium for chamber 18. The third arm 43 of the stopcock 41 provides a convenient drain for chamber 18 so that either electrolyte or flushing coolant may be removed therefrom.

Electrodes 28 and 30 are preferably centrally aligned in the bore of chamber 18 so that the gap between the electrodes is in horizontal registry with a window 45 consisting of a single thickness of glass.

In operation, the chamber 16 is supported in bracket 17 (as shown in Fig. 1) and the slit housing 46 of a spectroscope (not shown) is directed towards the window 45. A sample to be qualitatively analyzed is introduced into funnel 35 with stopcock 41 in the closed position (as shown in Fig. 2). A low voltage current of approximately 80 volts is then impressed across electrodes 28 and 30 by closing switch 11. This causes an arc to occur in the zone around the submerged portion 28a of the electrode 28 (as shown in Fig. 3). The lines emitted by this arc are then compared spectroscopically with characteristic reference lines of known elements so that the composition of the sample may be determined.

The method of the present invention requires that the metal or metals of the initial samples be in aqueous solution. There is a wide variety of methods available for accomplishing this, depending upon the nature of the initial sample, which are well known to those skilled in chemistry. Simple water-soluble compounds such as metal salts, certain bases such as sodium hydroxide, and the like, may be merely dissolved in water, heating being resorted to if necessary. In order to facilitate solution it may be desirable to employ an acid, particularly the mineral acids such as nitric acid, hydrochloric acid, sulfuric acid, and the like, thus converting the initial sample into a water-soluble salt of the metal or metals. In this regard, the use of nitric acid is particularly advantageous inasmuch as the metal nitrates are for the most part water-soluble. The concentration of acid employed will depend upon the nature of the initial sample sought to be dissolved. In many cases, a relatively dilute solution such as a solution comprising between about 5% and about 20% of the acid, may be sufficient. However, in certain cases where, for example, the metal in the initial sample exists in elemental state, as in alloys, it may be necessary to employ a concentrated acid, resorting to heat if necessary, in order to dissolve the sample. For example, with alloys it may be necessary to dissolve the initial material in boiling aqua regia, after which the acid solution can be diluted with water to provide the sample for analysis.

In many cases it may be desirable to pre-treat the initial material to remove therefrom materials which only serve to contaminate and to obscure detection. For example, samples of ores, coals, ceramics, minerals, concretes, soils and the like which contain large proportions of silica, may be treated with acid to extract the metals, after which the insoluble residue can be separated therefrom. In the case of organic materials such as biological materials, waste products, greases, oils, pharmaceuticals and the like, may be ignited to burn off the organic matter. The ash residue may then be dissolved by an appropriate treatment as discussed above.

One of the primary advantages of the present invention is that only a relatively small volume, for example 2 ml., of solution containing the example, is required for analysis. Thus the amount of initial sample may be relatively small, the particular amount required in any particular case depending upon the amount of organic matter, silica, and the like, associated therewith. Thus, if the initial sample is not exceptionally complex as in the case of pure metals, alloys, simple salts and the like, as little as about 10 ml. may be used. With samples having silica, organic matter and the like, associated therewith, correspondingly larger amounts of the initial sample may be required.

The concentration of the particular metal or metals required in the solution for detection may vary widely, as will be noted from the foregoing table, and will depend not only upon the particular metal but also upon the presence or absence of other metals. Although the metal or metals may be present in the solution in sufficient amount to be detectable, it may be present in such weakly ionizable form or of insufficient concentration by itself to provide visible discharge. In such case, a small amount of a strong acid such as nitric acid, hydrochloric acid, sulfuric acid and the like, or in some cases a known salt such as sodium chloride, may be added to the solution in order to enhance the discharge. In this case, the characteristic spectral lines of hydrogen of the acid (or of the metal of the known salt) will be seen in addition to the spectral lines of the metal or metals present in the same. In general, the total amount of ionizable material present in the solution in order to provide satisfactory visible discharge is at least about 5%, and preferably at least about 8% by weight of the solution. The maximum amount that may be present may vary widely and may be as high as about 60% or higher in some cases. Normally however, the amount of ionizable material in the solution is not over about 25%, preferably not over about 20% of the solution.

After the electrolyte containing the unknown sample has been prepared as described above, approximately 2 ml. of the electrolyte is poured into funnel 35. This amount of electrolyte should partially submerge electrode 28 as shown in Fig. 3. Switch 11 is then closed to produce the arc so that the characteristic lines of the elements in the sample may be detected with the spectroscope. The entire electrolyte solution can then be drained from chamber 18 by turning stopcock 41 to connect arms 40 and 43. Reverse turning of the stopcock is then used to flush chamber 18 one or more times, whereupon the next sample is ready for analysis.

It will thus be understood that I have provided an extremely simple and inexpensive apparatus which enables accurate and rapid spectroscopic analysis to be made. Only a few minutes are required to detect at least thirty-six elements, regardless of the composition or physical condition of the sample. A very important feature of the method and apparatus described herein is the fact that all of the sample is recovered after analysis. Furthermore, no expensive photographic equipment is required to obtain accurate visible results.

Having thus described my invention, I claim:

1. An excitation chamber for the analysis of electrolytic solutions, comprising an electrolyte chamber, a pair of electrodes supported in said chamber, a window in the wall of said chamber in registry with the termini of said electrodes, means for adjusting at least one of said electrodes, means for introducing and draining electrolyte into and out of said chamber, and a coolant jacket substantially surrounding said chamber.

2. An excitation chamber for the analysis of electrolytic solutions, comprising an electrolyte chamber, a pair of electrodes supported in said chamber, a window in the wall of said chamber in registry with the termini of said electrodes, means for adjusting at least one of said electrodes, means for introducing and draining electrolyte into and out of said chamber, a coolant jacket substantially surrounding said chamber, and means including a three-way stopcock for bypassing coolant from the jacket into the chamber.

3. A method of analyzing a material with respect to metallic elements therein, which comprises disposing a static body of electrolytic liquid containing said material in solution in surrounding relation to and in contact with a pair of spaced electrodes, with the liquid contacting one of the electrodes over a small area less than the area of liquid contact with the other electrode, applying to the electrodes a low voltage of magnitude to produce a luminous discharge from said one electrode to the electrolytic liquid, and spectroscopically viewing said discharge to distinguish the metallic elements in said material by the characteristic lines in the luminous discharge.

FLOYD TODD.

References Cited in the file of this patent

UNITED STATES PATENTS

| Number | Name | Date |
|---|---|---|
| 1,253,572 | Buchanan | Jan. 15, 1918 |
| 2,282,643 | Cutting | May 12, 1942 |
| 2,390,816 | Suits | Dec. 11, 1945 |
| 2,532,687 | Weichselbaum | Dec. 5, 1950 |

OTHER REFERENCES

Twyman et al., "Estimation of Metals in Solution by means of their Spark Spectra," pages 72 through 92 in Proceedings of the Royal Society, A, volume 133 of 1931.

Gibb, "Optical Methods of Chemical Analysis," first edition 1942, McGraw Hill Book Co., New York City, page 112 cited.